J. A. VAUGHN.
Grain Separator.
No. 1,196. Reissued June 11, 1861.
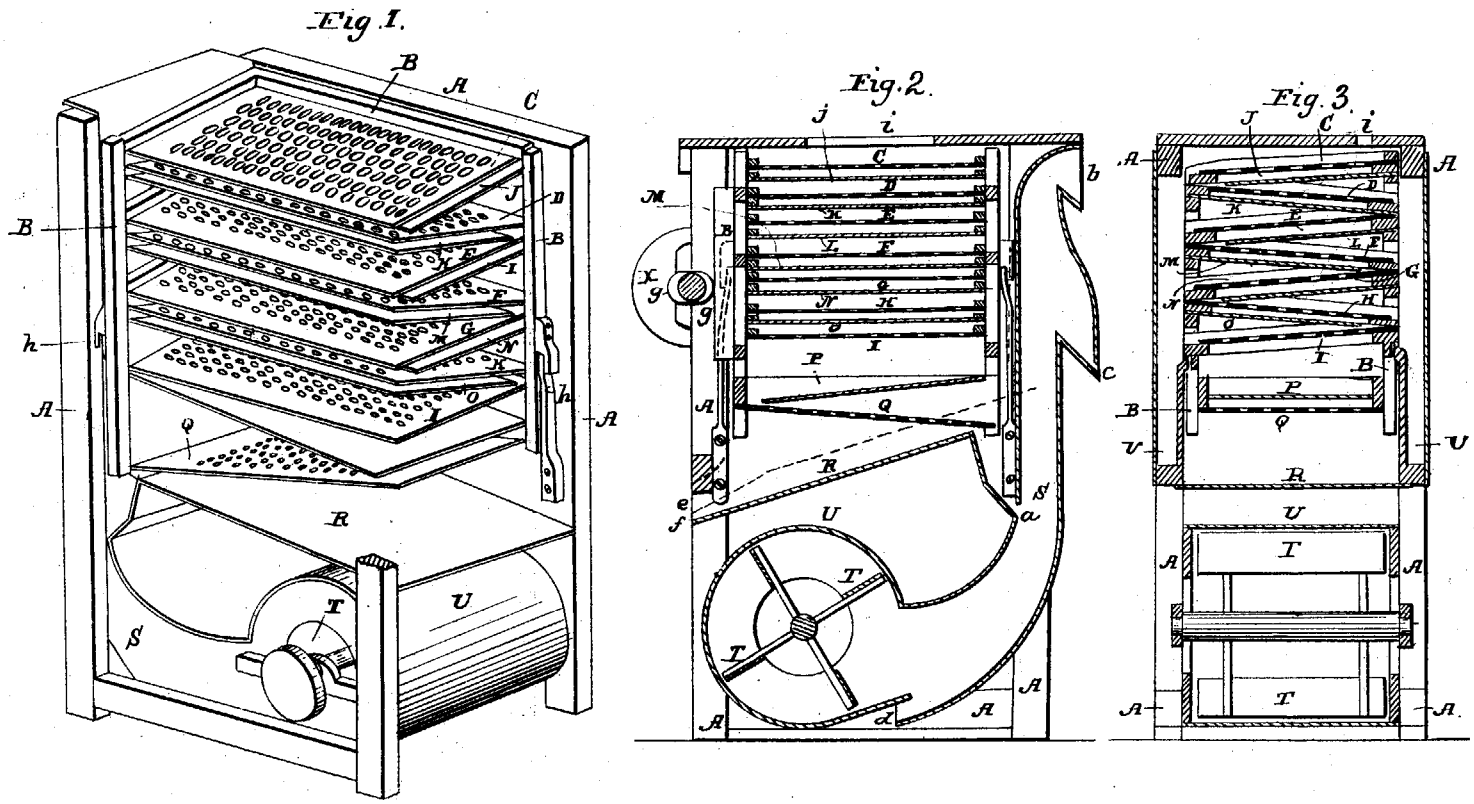
Witnesses:
S. Cohen
Julius Hirsch
Inventor:
James A. Vaughn
N. PETERS, Photo-Lithographer, Washington, D. C.

UNITED STATES PATENT OFFICE.

JAMES A. VAUGHN, OF CUYAHOGA FALLS, OHIO.

IMPROVEMENT IN GRAIN-SEPARATORS.

Specification forming part of Letters Patent No. 28,026, dated April 24, 1860; Reissue No. 1.120, dated January 8, 1861; Reissue No. 1,196, dated June 11, 1861.

*To all whom it may concern:*

Be it known that I, JAMES A. VAUGHN, of Cuyahoga Falls, in the county of Summit and State of Ohio, have invented certain new and useful Improvements in Grain-Separators; and I do hereby declare the following to be a full, clear, and exact description of the construction and operation of the same, reference being had to the accompanying drawings, making a part of this specification, in which—

Figure 1 represents a perspective view of the grain-separator, with a portion represented as broken away to show the parts underneath or behind them. Fig. 2 represents a longitudinal vertical section through the machine, and Fig. 3 represents a vertical cross-section through the same.

Similar letters, where they occur in the several figures, denote like parts of the machine in all the drawings.

In the separation of wheat from other lighter grains and impurities gathered with it zigzag screens have been used in connection with a shake motion and a blast, several instances of which may be found in the records of the Patent Office. Boxes have also been connected with shaking screens to catch the grain—such as oats and other materials—that passes over the screens. The objection to connecting the boxes with the screens is this: that the boxes become loaded with grain, and, as this load has to be shaken with the screens, it requires much power, and is a drag upon the motor that operates the screens or machine and impedes their free and easy action. I am aware too that a series of zigzag screens and a long fan have been used together as a grain-separator. This arrangement is very objectionable, first, because the riddles are difficult of access, liable to become clogged, and must be often cleaned to be at all efficient; and, second, as to a long fan, it cannot be made to produce a uniform blast throughout the wind-trunk because the air must be drawn into the fan-case at its ends only, and none at the center, the consequence of which is that there is a sharp blast at the sides of the wind-trunk and comparatively no blast in its central portion. These imperfections make such a grain-separator of comparatively little or no practical value, and my object and aim is and has been to overcome these objectionable features, which I believe I have done, as I will hereafter explain.

The nature of my invention consists, first, in combining a series of zigzag screens and directing-boards that have a shake motion communicated to them with stationary chambers for receiving the material that passes over or falls from them, for the purpose of avoiding the load and drag that is upon such screens when they have the boxes or chambers united with them.

My invention consists, secondly, in combining with a series of zigzag screens and directing-boards that have a shake motion communicated to them the stationary receiving-chambers and a short fan.

My invention consists, thirdly, in the combination of a directing-board, cockle-riddle, and cockle-board, for a purpose which will be explained.

To enable others skilled in the art to make and use my invention, I will proceed to describe the same with reference to the accompanying drawings.

A represents the main frame of the separator, in which I arrange a second frame, B, that carries a series of zigzag riddles, C D E F G H I, and underneath them, respectively, a series of directing-boards, J K L M N O. These riddles and directing-boards incline across or the narrow way of the machine, which admits of their being easily got at for the purpose of cleansing from one end, and without being incommoded by the blast-trunk, as is the case when arranged lengthwise of the frame, as above stated.

P is a directing-board underneath the series of screens and their boards, which carries the grain that passes through the overlying riddles to the extreme end of what I call the "cockle-screen" Q, that is perforated to allow cockle or impurities of about its size to pass through it onto a cockle-board, R, which directs it out of the machine while the wheat or other grain from which the cockle has been separated passes into the wind or blast trunk S at *a*, and is acted upon by the blast from the fan T. The fan-case U is arranged across the machine so as to contain a short fan, and is consequently more evenly supplied with air than if arranged lengthwise of the frame. The wind-trunk, S, being narrow, admits of a uniform blast, which a wide or long one would not admit of, for reasons heretofore stated. The light impurities are blown out at *b*, the light grain passes out at *c*, and the heavy wheat at *d*. The oats, sticks, and other impurities that pass over the screens drop into the chambers V V, which are stationary and not connected with the riddles or riddle-frame, and pass out at *e*, as represented by dotted lines in Fig. 1, at the sides of the machine, and the cockle runs off at *f*, each delivery for each specific separation of the several grains being separate from each other and the dust separate from the seeds.

W is a shaft to which the power that operates the machine may be applied. It has upon it a pulley, X, over which a belt may pass to drive the fan, said belt passing around a pulley on the fan-shaft for this purpose. On the shaft W there is a cam, *g*, for vibrating riddle-frame B, with its series of screens and boards, said riddle-frame being held up against the cam by means of the springs *h*, to which it is connected. The vibration which the riddle-frame may receive from a cam without producing an actual blow or jarring motion may be very great or rapid, and is peculiarly adapted to the separation of oats from wheat.

It is obvious that oats will readily pass through a screen that wheat will pass through, provided the oat goes point foremost into the perforations, and a jarring motion like that produced by a crank will so turn or jar the oats into the openings in the screen and allow them to go through with the wheat. So much so is this the case that two hundred or two hundred and fifty vibrations of the screens by a crank is the limit that will admit of the oats passing over without turning and going through the screen, whilst with a cam-motion I can run my screens up to four hundred or four hundred and fifty vibrations per minute, and correspondingly increase the capacity of the machine, as it is of course limited only by the quantity of grain that can be passed over the riddles. These changes which I have made in this class of machines have given it an importance and value not heretofore known. The long screens, and the long fan, and the wide trunk, and the shaking grain-boxes, and the crank motion were all objectionable. I have dispensed with them all, and have made an entirely-different reorganization, by which an imperfect machine has become one of the most valuable ones connected with the cleaning and separating of grains from the grosser seeds, filth, or impurities that are gathered with or will get mixed with it. The grain is fed into a hopper that stands over an opening, *i*, in the top of the machine, and passes over and through the series of screens and boards, each passage over each screen taking out the oats, sticks, &c., while the wheat, with some finer impurities, passes from directing-board to screen, and from screen to directing-board, until the finer impurities pass through the screen Q, and the wheat passes into the blast-trunk, where it is cleaned and further separated from the lighter grains. The heavy wheat, the lighter wheat, the dirt, chaff, or filth, the cockle, and the oats all have their separate exits, though all are entered at the same place. The oats and the light wheat are not estimated as offal or impurities, as they are valuable and kept separate. The separation is perfect and expeditious, and the machine easily kept clean. It requires but little power to operate it, is cheap, durable, and very efficient.

Having thus fully described the nature and object of my invention, what I claim therein as new, and desire to secure by Letters Patent, is—

1. In combination with a series of zigzag screens or riddles and a series of directing-boards having a shake motion, the stationary receiving-chambers for receiving the material from the screens, substantially as herein described.

2. The combination of the series of zigzag screens and directing-boards having a shake motion, the stationary receiving-chambers, and short fan, when arranged to operate substantially as herein described.

3. The combination of the directing-board P, cockle-riddle Q, and cockle-board R, substantially as and for the purpose herein described.

JAMES A. VAUGHN.

Witnesses:
P. G. SOMERS.
CHAS. HUNT.